United States Patent [19]
Zajac

[11] Patent Number: 4,994,921
[45] Date of Patent: Feb. 19, 1991

[54] HALFTONE IMAGING SYSTEM AND METHOD

[76] Inventor: John Zajac, 1137 Angmar Ct., San Jose, Calif. 95121

[21] Appl. No.: 195,712

[22] Filed: May 18, 1988

[51] Int. Cl.$^5$ .............................................. H04N 5/84
[52] U.S. Cl. .................................................. 358/244
[58] Field of Search ............. 358/75, 248, 244, 244.1, 358/244.2; 354/75, 76, 81; 355/20

[56] References Cited

U.S. PATENT DOCUMENTS

| | | | |
|---|---|---|---|
| 2,511,531 | 6/1950 | Hencke et al. | 354/76 |
| 4,219,268 | 8/1980 | Uchida | 354/81 |
| 4,468,693 | 8/1984 | Fujita et al. | 358/75 |
| 4,692,006 | 9/1987 | Rice et al. | 354/75 |
| 4,726,675 | 2/1988 | Shiota et al. | 358/244 |
| 4,800,437 | 1/1989 | Hosoya | 358/244 |

FOREIGN PATENT DOCUMENTS 2074413 10/1981 United Kingdom ................ 358/332

OTHER PUBLICATIONS

Leavitt, "How to Make Photographs From Your Home Computer Displays", Popular Photography, vol. 91, pp. 41, 44, 100, 101, May 1984.

Appel et al., "Generating Movies or Similar Pictures from Images Displayed on a Graphics Terminal", IBM Tech. Disc. Bul., vol. 20, No. 7, 12/77, pp. 2913 and 2914.

"Photographic Image Computer Analyzer", IBM Tech. Disc. Bul., vol. 29, No. 7, Dec. 1986, pp. 2823 and 2824.

*Primary Examiner*—Donald McElheny, Jr.
*Attorney, Agent, or Firm*—Flehr, Hohbach, Test, Albritton & Herbert

[57] ABSTRACT

System and method for producing halftone images, which are particularly suitable for use in desk top publishing. An image of an object is displayed on a video display screen, and a picture of the screen is taken with a halftone camera to make a photographic halftone image of the image displayed on the screen. With a color monitor, the color guns are actuated one at a time to display successive monochromatic images of the component colors, and halftone photographs of these images are taken and superimposed to form the halftone image.

10 Claims, 2 Drawing Sheets

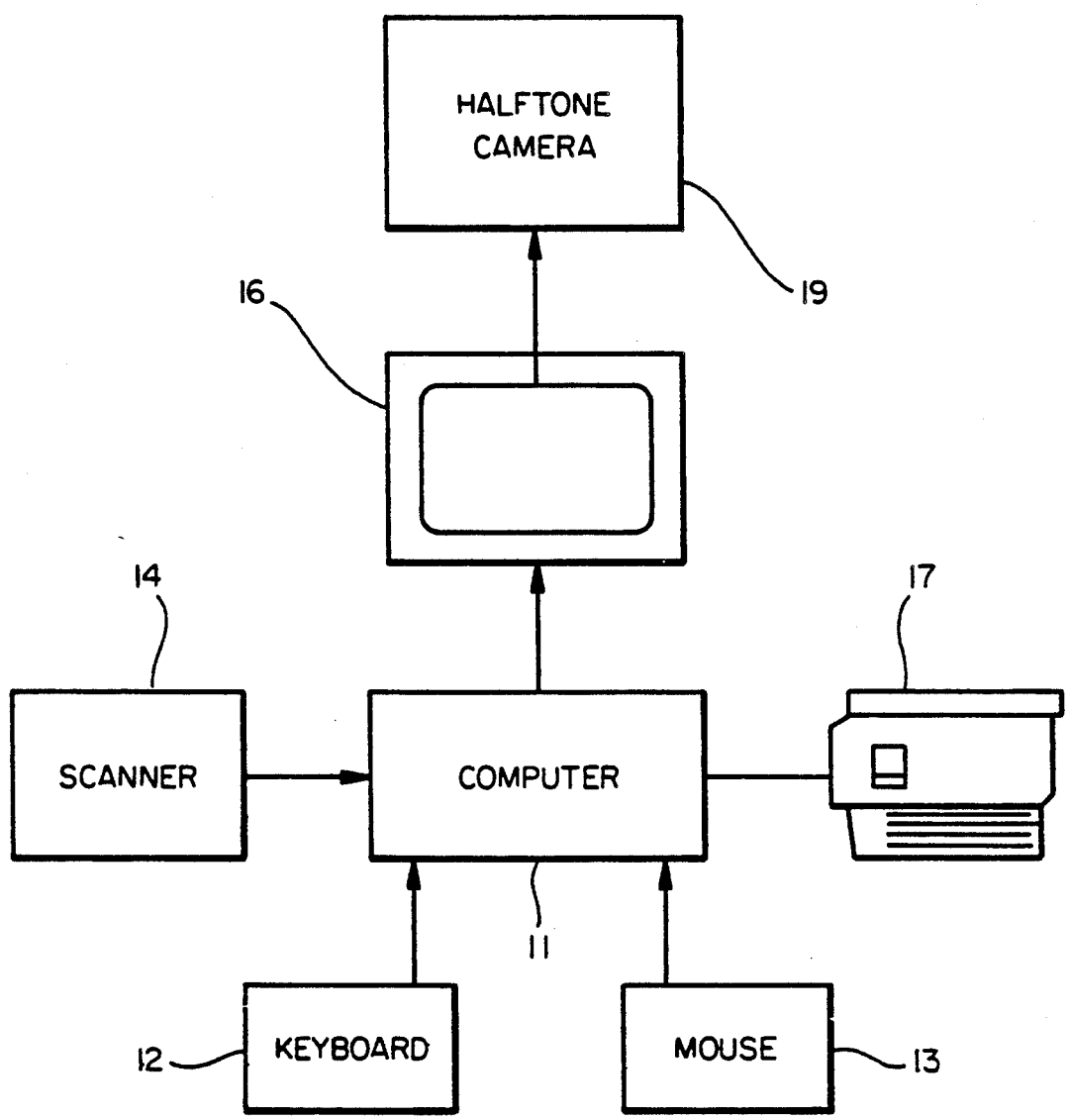
FIG_1

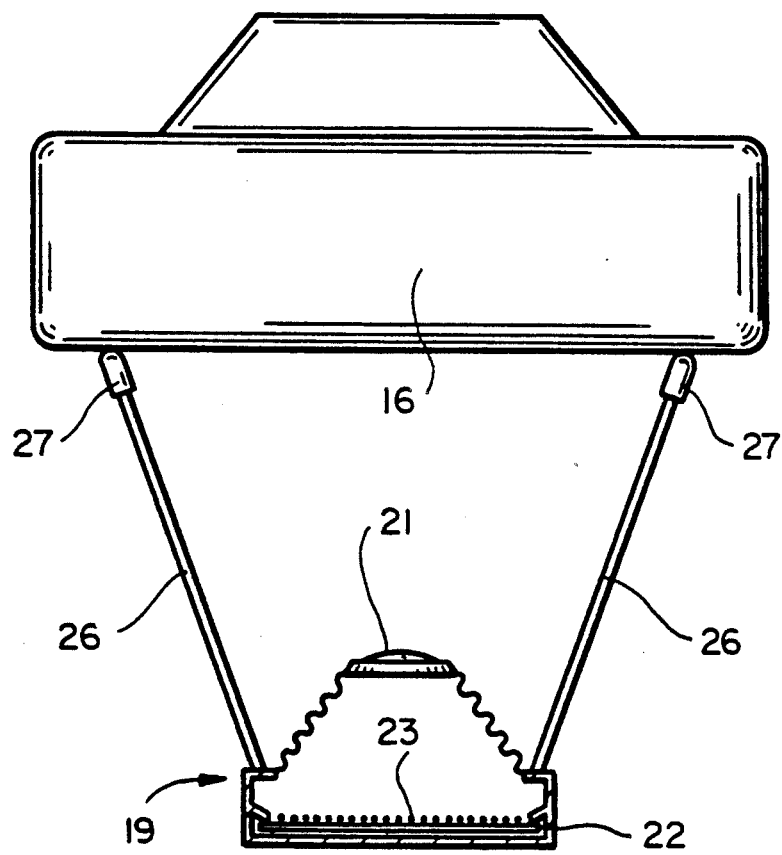
FIG_2
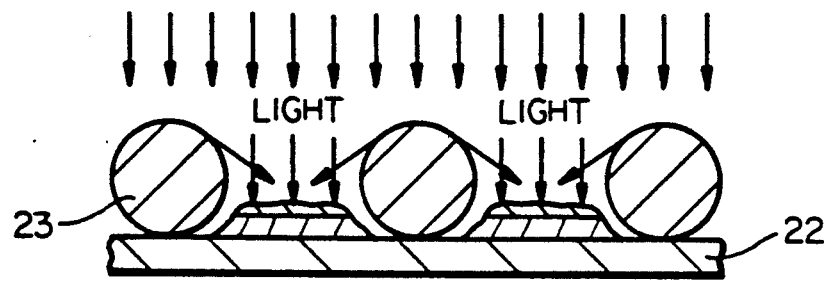
FIG_3

HALFTONE IMAGING SYSTEM AND METHOD

This invention pertains generally to computerized publishing systems, and more particularly to a system and method of printing a halftone image in a computerized publishing system.

The development of laser printers has made it possible to compose and print documents of relatively high quality at relatively low cost and with a minimum of equipment. Because of the relatively small amount of space required, this type of operation has come to be known as desk top publishing.

One problem which has been encountered in desk top publishing is the printing of half tone images. This problem arises because the printers commonly employed in desk top publishing can only print dots in a single color, such as black, not shades of gray. While it is possible, in theory, to produce shades of gray by arranging the dots in groups and printing only a portion of the dots in each group, the gray tones are produced at the expense of resolution. Consequently, the resulting image may not have enough shades of gray for a good half tone image, or it may not have sufficient resolution for a good picture, or both.

In order to produce an acceptable half tone image, a minimum of 64 shades of gray are required. This can be obtained with 64 dots arranged in an 8×8 array. A 4×4 array (16 shades of gray) gives very minimal quality, and a 16×16 array (256 shades of gray) gives a halftone image of professional or magazine quality.

Printers and scanners currently employed in desk top publishing applications typically have a resolution of 300 dots per inch. In order to print 16 shades of gray (with a picture scanned at 300 dots per inch in 256 shades of gray), it would be necessary to throw away 15 of every 16 bits of information from the scanner, and to print 64 shades of gray, it would be necessary to throw away 63 of every 64 bits. A picture scanned at 300 dots per inch and printed with 64 shades of gray on a 300 dot per inch printer would have a resolution of only 37.5 elements per inch, which is not an acceptable level of resolution. Printers having a higher resolution (e.g. 2400 dots per inch) might give both sufficient gray tones and sufficient resolution for a good half tone image, but such printers are very expensive and thus available only as an expensive, time consuming out-of-house service. Although halftone images of good resolution and quality can also be produced on machines of relatively high resolution (e.g. 2400 dots per inch) such as a Linotype machine, such machines are very expensive and relatively inflexible with regard to correction or adjustment of the images.

It is in general an object of the invention to provide a new and improved system and method for forming halftone images.

Another object is to provide a system and method of the above character which are particularly suitable for use in desk top publishing applications.

Another object is to provide a system and method of the above character which can be utilized with color images as well as monochromatic images.

Another object is to provide a system and method of the above character which are relatively inexpensive to set up and use.

These and other objects are achieved in accordance with the invention by displaying an image of an object on a color or an analog black and white video display screen, and taking a picture of the screen with a halftone camera to make a photographic halftone image of the image displayed on the screen. With a color monitor, the color guns are actuated one at a time to display successive monochromatic images of the component colors, and halftone photographs of these images are taken and superimposed to form the halftone image.

FIG. 1 is a block diagram of one embodiment of a desk top publishing system having means for producing halftone images in accordance with the invention.

FIG. 2 is a top plan view, partially sectioned, of the video monitor and halftone camera in the system embodiment of FIG. 1.

FIG. 3 is an enlarged fragmentary sectional view, illustrating the formation of a halftone image in the camera of FIG. 2.

The system illustrated in FIG. 1 includes a computer 11, which in the preferred embodiment, comprises a microprocessor-based personal computer 11 such as an Apple Macintosh II. A keyboard 12 and a mouse 13 are connected to two of the input ports of the computer for inputting information and commands, and an optical scanner 14 is connected to a third input port for scanning documents and inputting data about the documents to the computer. A video display monitor 16 and a laser printer 17 are connected to the computer as output devices.

In a presently preferred embodiment, scanner 14 is of conventional design and has a resolution of 300 dots per inch. The data from the scanner defines an image of a document or other object scanned by the scanner. This data can be processed by the computer and stored in the computer memory and/or presented to a peripheral device.

A video monitor utilized with a Macintosh II computer typically has a resolution of approximately 75 dots per inch and a screen which may be 6⅝" high by 8¾" wide, or larger. Each of these dots or pixels is capable of displaying any one of 256 shades of gray. Thus, the image displayed by the screen is almost photographic in quality. Resolution can be increased even further by photoreduction of the image. Thus, for example, a 3½" by 4⅜" picture produced by reduction of a 6⅝" by 8¾" video screen image would have 256 shades of gray and 150 dots per inch, which is the maximum resolution for printing with the techniques currently available. A 4" by 5¼" picture produced in this manner would have 256 shades of gray at 125 dots per inch, which is the standard magazine quality today.

A halftone camera 19 is positioned in front of the screen of the video monitor to form a photographic halftone image of the image displayed on the video screen. The camera includes a lens 21 which focuses light from the video screen onto a sheet of photographic paper or film 22 through a halftone screen 23. As best seen in FIG. 3, light passing through the halftone screen is defocused by the screen or mesh, and the defocused light is more highly concentrated in the areas away from the mesh. As the amount of light increases, the size of the area which is more highly exposed also increases. The image thus formed is a halftone image of the video image displayed on the screen of the monitor. The paper or paper on which the image is formed is preferably a positive medium such as a Polaroid film, in which case the halftone image can be used directly in a paste-up without further processing.

The mesh of the halftone screen is selected in accordance with the resolution of the halftone image to be produced. A screen having a mesh of 125 lines per inch, for example, provides a halftone image having a resolution of 125 dots per inch.

Instead of a halftone mesh or screen, the halftone camera can employ any other suitable technique for producing the photographic halftone image. This image can, for example, be formed by scratched lines on glass.

The halftone camera is provided with a plurality of legs 26 with rubber tips or feet 27 which are engageable with the face of the video display screen to position the camera in a fixed position in front of the screen. This insures stability, proper focusing, and parallelism between the film and the video screen. The legs are adjustable in length, and this adjustment is preferably made digitally in discrete steps in order to assure that all of the legs will be exactly the same length. The camera can be operated at a fixed speed (e.g. ¼ second), with a fixed aperture (e.g. f/11), a fixed focus (e.g. 12 inches) and no viewfinder. Reductions in the size of the halftone image are made by the using different lenses, or a zoom lens, with the camera remaining in the same position.

In the foregoing discussion, it is assumed that the monitor which is photographed to form the halftone image is a monochromatic (e.g., black and white) monitor. With a polychromatic (i.e., color) monitor, the electron guns for the different colors (e.g. red, green and blue) in the cathode ray tube of the monitor are turned on one at a time to display successive monochromatic images of the object. A halftone photograph is taken of each of the monochromatic images, and the halftone images are superimposed during the offset, or other, printing process to form a composite halftone image. If desired, registration marks can be displayed outside the graphics area on the monitor screen to facilitate alignment of the different halftone images. The operation of the electron guns to provide successive monochromatic images in the primary colors can be controlled by the computer or by any other suitable means.

It is also possible to make halftone color separations with a black and white monitor. To do so, the printer uses three or four black and white negatives and a different color ink for printing each one.

The invention has a number of important features and advantages. It is fast, easy to use, and fully controlled by the user. Since the halftone image is displayed on the screen before it is printed, the user can electronically modify and be certain exactly what the image will be. In other words, the invention provides the type of operation currently referred to by computer types as "what you see is what you get", or WYSIWYG. The invention can be used either with a monochromatic monitor (e.g., black and white) or with a polychromatic (color) monitor. It is also affordable, requiring only a camera in addition to the equipment normally employed in desk top publishing and eliminating the need for costly and time consuming linotype printing of the halftone image.

It is apparent from the foregoing that a new and improved system and method of producing halftone images have been provided. While only certain presently preferred embodiments have been described in detail, as will be apparent to those familiar with the art, certain modifications and changes can be made without departing from the scope of the invention as defined by the following claims.

I claim:

1. In a system for producing a halftone image of an object: a computer having a video display screen, means for inputting data defining an image of the object to the computer for display on the video display screen, and a halftone camera positioned in front of the video display screen for making a photographic halftone image of the image displayed on the screen.

2. The system of claim 1 wherein the halftone camera includes of sheet of photographic film and a halftone screen through which light from the video image is passed to form the halftone image on the sheet of film.

3. The system of claim 2 wherein the film is a positive film, and the image formed on the film is a positive image.

4. The system of claim 1 wherein the camera includes a plurality of legs engageable with the face of the video display screen for positioning the camera in a predetermined position in front of the screen.

5. In a method of producing a halftone image of an object, the steps of: displaying a video image of the object on a video display screen, positioning a halftone camera in front of the video display screen, and actuating the camera to make a photographic halftone image of the image displayed on the screen.

6. The method of claim 5 wherein the halftone image is formed by exposing a sheet of photographic film to the video image through a halftone screen.

7. In a system for producing a halftone image of an object: a polychromatic video display screen on which a plurality of monochromatic images are superimposed to form a polychromatic image, means for conditioning the video display screen to display separate monochromatic images of the object, a halftone camera positioned in front of the video display screen for making a photographic halftone image of each of the monochromatic images of the object, and means for superimposing the halftone images to form a composite halftone image of the object.

8. The system of claim 7 wherein the video display screen comprises a cathode ray tube having electron guns for forming the monochromatic images, and the means for conditioning the video display screen to display the monochromatic images separately includes means for actuating the electron guns one at a time.

9. In a method of producing a halftone image of an object, the steps of: displaying a plurality of monochromatic images of the object on a polychromatic video display screen, said images being of different colors which can be superimposed to form a polychromatic image of the object on the video display screen, positioning a halftone camera in front of the video display screen, actuating the camera to make a photographic halftone image of each of the monochromatic images, and superimposing the halftone images to form a composite halftone image of the object.

10. The method of claim 9 wherein the halftone images are formed by exposing sheets of photographic film to the monochromatic images through a halftone screen.

* * * * *